United States Patent
Arnicar et al.

(10) Patent No.: US 12,253,381 B2
(45) Date of Patent: Mar. 18, 2025

(54) USING ROBOT OBSERVATIONS

(71) Applicant: Zoox, Inc., Foster City, CA (US)

(72) Inventors: Taylor Andrew Arnicar, San Jose, CA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 222 days.

(21) Appl. No.: 18/060,825

(22) Filed: Dec. 1, 2022

(65) Prior Publication Data
US 2024/0183684 A1    Jun. 6, 2024

(51) Int. Cl.
G01C 21/00    (2006.01)
(52) U.S. Cl.
CPC ..... G01C 21/3841 (2020.08); G01C 21/3807 (2020.08)

(58) Field of Classification Search
None
See application file for complete search history.

(56) References Cited

U.S. PATENT DOCUMENTS

| | | | |
|---|---|---|---|
| 11,620,906 B2 * | 4/2023 | Hu | G05D 1/0212 |
| | | | 701/25 |
| 2008/0228437 A1 * | 9/2008 | Damarla | G01S 5/18 |
| | | | 702/151 |
| 2019/0301873 A1 * | 10/2019 | Prasser | G01C 21/3848 |
| 2019/0384303 A1 * | 12/2019 | Muller | G08G 1/166 |
| 2020/0217666 A1 * | 7/2020 | Zhang | G01C 21/383 |

* cited by examiner

Primary Examiner — Daniel L Greene
(74) Attorney, Agent, or Firm — Lee & Hayes, P.C.

(57) ABSTRACT

Techniques are disclosed for utilizing synchronized robot observations. The techniques may include receiving first log data associated with a first vehicle, receiving second log data associated with a second vehicle, determining that a first portion of the first log data is time related to a second portion of the second log data, and using the first portion and the second portion for mapping and/or training models.

20 Claims, 5 Drawing Sheets

USING ROBOT OBSERVATIONS

BACKGROUND

Robots may use sensors to capture sensor data to detect objects in an environment. Sensor data captured by robots may be utilized in generating ground truth data for offline development, testing, and/or training scenarios or generating and updating maps of an environment (e.g., an environment may change such that a map does not accurately reflect the environment, which may render the map data unsuitable for use). In some instances, the captured sensor data and perception processing performed by an autonomous vehicle may provide perception data with a degree of uncertainty or incomplete tracking of objects in the environment. Utilizing the perception data with the degree of uncertainty or incomplete tracking may be difficult.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
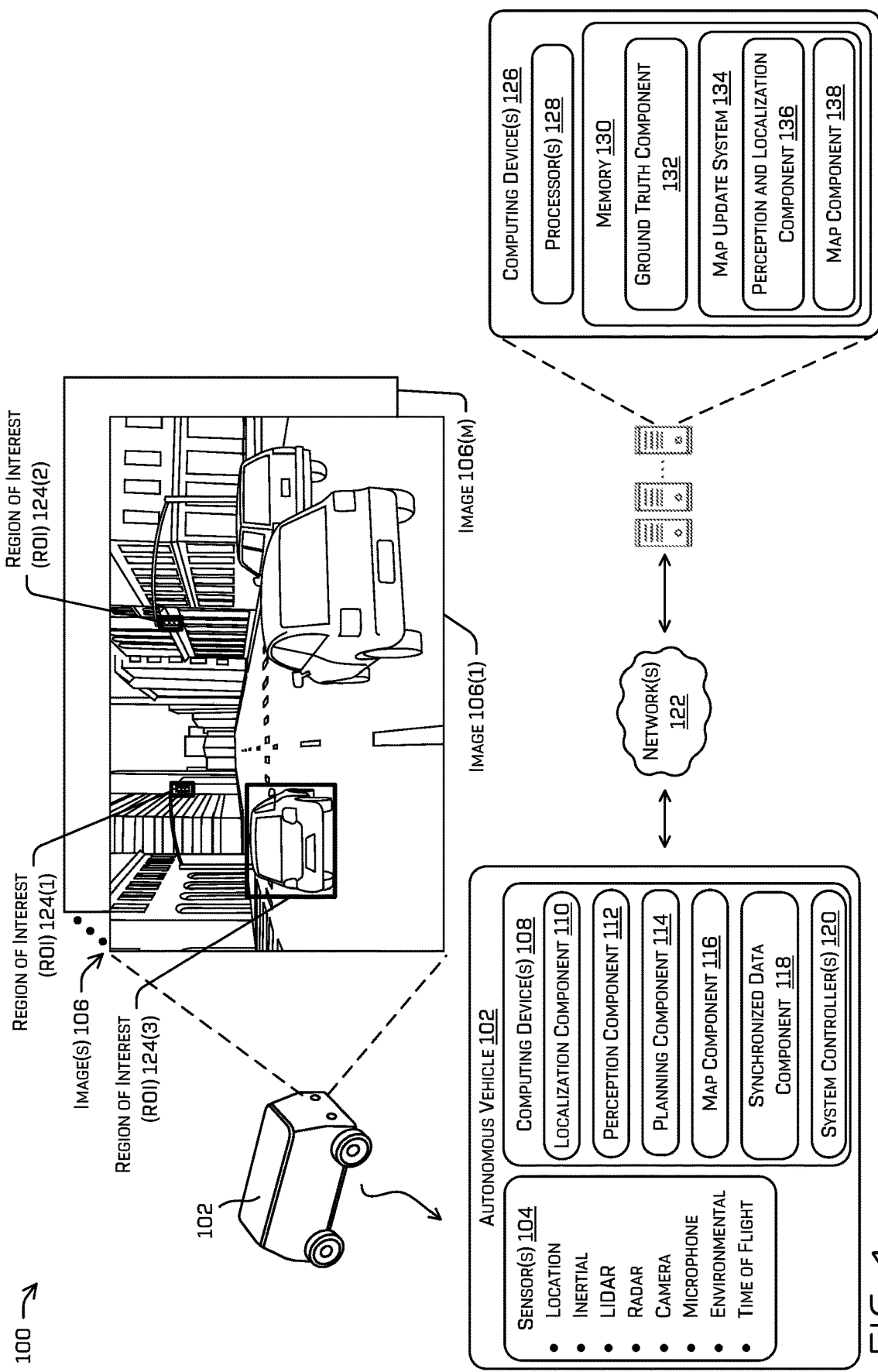
FIG. 1 illustrates an example autonomous vehicle system in which environment data may be generated based on time-related observations of two or more autonomous vehicles of objects in the environment.

This disclosure is directed to systems and techniques in which environment data may be generated based on time-related observations of two or more robots (e.g., autonomous vehicles or otherwise) of objects in the environment (e.g., other vehicles, traffic objects, of one another, etc.).

Robots operating in an environment may generate sensor data and/or perception data generated based on the sensor data. The sensor data and/or perception data may be collected as log data. The log data may be utilized to generate environment data such as ground truth data, map data for objects in the environment, and so on. Generally, such sensor data and/or the algorithms that rely on them, may be associated with various levels of uncertainty (e.g., based on errors in sensor data, sensor calibration, algorithmic/processing errors, computational limitations, etc.).

In some examples according to this disclosure, two or more robots operating in proximity to one another in an environment (e.g., within a range of the perception components of the robots) may generate time-related log data which may be captured and/or generated at approximately the same time and/or location and that may have a known timing relationship. Log data of a first robot may be time related to log data of a second robot if the log data includes observations while the robots were co-visible (e.g., within perception range of one another) and a timing relationship between the observations of the first and second robots is included in the log data or can be determined for the log data. Of course, in some examples, this need not be so limiting. For instance, log data within a threshold amount of time of two or more observers may be relied upon (e.g., as may be determined by some centralized notion of time). In other examples, such log data need not be synchronized at all, so long as there is at least some element of co-visibility for a period of time in log data of one of the vehicles. Various examples of the above will be described in detail herein. In other words, subsequent analysis of time-related log data from a first robot and a second robot may determine, for log data of the first robot generated at a first time, a timing offset from log data generated by the second robot at a second time. In some examples, the time-related log data of two or more of the robots may include a timing offset or similar data to allow the subsequent analysis to determine the timing relationship between the log data of the different robots. Additionally or alternatively, the two or more robots may share a time system (e.g., robots of a same operator) such that the time-relation of the log data of the two or more robots may be determined during a subsequent analysis, potentially without a timing offset being included in the time-related log data generated by the two or more of the robots. As above, in still further examples, such time offsets may not be needed (e.g., based on using the co-visibility as additional constraints in, for example, a factor graph).

In some examples, the generation of log data may be synchronized between the two or more robots such that log data of the two or more robots is generated at the same timing or within a threshold margin of error. Additionally or alternatively, the log data of the one or more robots may be interpolated to align the timings of the log data of the different robots during a subsequent analysis (e.g., based on a timing offset determined during the generation of the log data, a timing offset determined based on a shared time system, etc.).

The time-related log data may be utilized to generate data such as ground truth data, map data for objects in the environment, and so on. In some examples, operations performed using the time-related log data discussed herein may be performed by one or more of the robots, one or more remote system(s) receiving the data from the robots, or a combination thereof.

Examples below may be discussed in the context of autonomous vehicles. However examples are not so limited and may include other types of robots, semiautonomous vehicles, and/or piloted vehicles.

As mentioned above, the time-related log data may be utilized to generate ground truth data. Such ground truth data may be utilized in off-line development, training, testing and evaluation of the systems of the robots, such as an autonomous vehicle controller. The time-related log data from the first vehicle and the second vehicle may be utilized in a variety of ways to provide improved ground truth data over what otherwise may be generated based on log data of the first vehicle. For example, the ground truth data may be utilized with the time-related log data to generate simulation scenarios or to determine performance metrics of the autonomous vehicle controller. In another example, the ground truth data may be utilized to evaluate and/or prioritize further development or improvements of the autonomous vehicle controller. For example, the ground truth data may be used as, or to generate, a replacement for the output of the perception component to a planner component. The performance of the planner with the input based on the ground truth data may be compared to the performance of the planner when operating with the output of the perception component to determine whether the performance of the planner is improved sufficiently for resources to be allocated to improving the operation of the perception component.

In some systems, the location of a vehicle in an environment as determined by its own localization component may be more reliable or likely to be accurate than a location of the vehicle as determined by another vehicle's perception component. In such a system, ground truth generation operations may utilize the location of the second vehicle as determined by the localization component of the second vehicle as the ground truth location of the second vehicle.

In another example, ground truth generation operations may determine ground truth data for objects in the environment by performing an optimization based on each robot's respective position as determined by its own localization component and the perceived relative position of other robot(s) and objects in the environment as determined by the robots' perception components (e.g., factor graph optimization). Similar optimizations may be performed for the robots' location if the position generated by the localization component is not utilized or may be utilized in combination therewith.

Further, ground truth generation operations may utilize the time-related log data to fill gaps in object tracking in each robot's log data. This may allow the ground truth generation operations to generate longer tracks for objects in the environment than would otherwise be generated based on log data of the first vehicle. For example, an object in the environment may become occluded from view by the perception component of the first vehicle for a period of time before becoming visible again. Ground truth generation operations based on the log data of the first vehicle may determine the sensor data related to the object before and after it is occluded is related to the same object but the system may be unable to generate data for the object during the period it was occluded. If the perception component of the second vehicle perceived the object during the period it was occluded from the sensors of the first vehicle, ground truth generation operations based on the time-related log data may fill the gap in the track of the object utilizing the sensor and/or perception data of the second vehicle from that time.

While ground truth generation operations are discussed herein in the context of generating ground truth data for development, training, testing and/or evaluation of, for example, autonomous vehicle controllers. Implementations are not limited to such uses of ground truth data.

Further, some examples may utilize the time-related log data to create and/or update map data related to the environment in which the autonomous vehicles are operating. For example, one or more autonomous vehicles or a remote system may determine an object in the environment does not seem to match or otherwise appear in the map data (e.g., a new object, an object has been moved, etc.). In response, two or more autonomous vehicles may obtain time-related log data including the object that does not seem to match or otherwise appear in the map data. The two or more autonomous vehicles may operate to obtain the log data of the object while within range of their respective perception systems (e.g., such that the two or more autonomous vehicles may perceive each other while perceiving and generating log data for the object). Map data may then be generated, for example, in a similar manner as discussed above for ground truth generation operations for simultaneously viewed objects (e.g., by optimization based on each robot's respective position as determined by its own localization component and the perceived relative position of the object and the other robot(s) in the environment as determined by the robots' perception components). The generated map data for the object may be compared to existing map data to determine if the object is a new map object, a moved map object, or already present in the map data. The map data may then be updated accordingly.

The techniques and systems described herein can improve the functioning of a computing device, such as an autonomous operation system, by providing improved environment data based on the synchronized observations of two or more robots (e.g., autonomous vehicles or otherwise). For example, synchronized observation of other vehicles, of traffic objects, of one another and so on may be utilized to generate improved data regarding the environment. The improved data generated by techniques and systems according to this disclosure may improve the development, training, testing, evaluation, operation and/or safety of robots such as autonomous vehicles. For example, techniques and systems according to this disclosure may provide improved ground truth data for use in offline development, training, testing and/or evaluation of autonomous vehicle controllers. Using such data in development, training, testing and/or evaluation of the autonomous vehicle controller may enhance the safety of the autonomous vehicle in live operation. Additionally, the usage of the improved data generated by techniques and systems according to this disclosure may allow for more precise and/or efficient updates to be performed for map data utilized by autonomous vehicles. These and other improvements to the functioning of the computer are discussed herein.

FIG. 1 illustrates an example autonomous vehicle system 100 in which environment data may be generated based on synchronized observations of two or more autonomous vehicles of objects in the environment (e.g., other vehicles, traffic objects, of one another, etc.). Environment data may include data such as ground truth data, map data for objects in the environment, and so on. In some instances, an autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 102 may receive image(s) 106(1) to 106(M) (collectively "images 106"), where M is any integer greater than 1, from the sensor(s) 104. The discussion herein primarily discusses images, for ease, but it is contemplated that the techniques may be applied to any sensor data that has the capability to discretely represent an object (e.g., a point cloud including points that represent an object).

In some examples, the autonomous vehicle may include computing device(s) 108 that may include a localization component 110, a perception component 112, a planning component 114, a map component 116, a synchronized data component 118, and/or a system controller(s) 120.

In at least one example, the localization component 110 can include functionality to receive data from the sensor system(s) 104 to determine a position of the vehicle 102 (also referred to herein as localization data). For example, the localization component 110 can include and/or request and receive a map of an environment (e.g. from the map component 116) and can continuously determine a location of the autonomous vehicle within the map (e.g. localize a position of the autonomous vehicle 102 on a global map and/or a local map). In some instances, the localization component 110 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 110 can provide the localization data to various components of the vehicle 102 to determine an initial position of an autonomous vehicle for generating a candidate trajectory, as discussed herein.

The perception component 112 may include one or more ML models and/or other computer-executable instructions for detecting, identifying, segmenting, classifying, and/or tracking objects from sensor data collected from the environment of the autonomous vehicle 102. In some instances, the perception component 112 may receive sensor data from sensor(s) 104 of the autonomous vehicle 102 and localization data from the localization component, determine perception data from the sensor data, and transmit the perception data to a planning component 114 for use by the planning component 114 to determine one or more trajectories, and/or control motion of the autonomous vehicle 102 to traverse a path or route, though any such operation may be performed in various other components. In some instances, the perception data may comprise a region of interest (an "ROI") and/or a track associated with an object detected in an image. The planning component 114 may determine instructions for controlling operations of the autonomous vehicle 102 based at least in part on the ROI and/or the track.

For example, the perception component 112 may detect an object in the environment and classify the object (e.g., "traffic signal," "four-wheeled vehicle," "semi-truck," "pedestrian," "animal," "construction vehicle"). In the illustrated example, autonomous vehicle 102 may receive image(s) 106 comprising image 106(1), which includes a representation of a two traffic signals and three other vehicles. The perception component 112 may generate ROIs 124 for objects in the image(s) 106. For ease of illustration and understanding, ROIs 124 are not shown for every object in the images 106. More particularly, the illustrated example includes ROIs 124(1), 124(2), and 124(3) which correspond to the two traffic lights and one of the vehicles represented in image 106(1), respectively. In some examples, the vehicle in ROI 124(3) may be another autonomous vehicle. In the illustrated example, the ROIs 124 are represented as bounding boxes, although other techniques for identifying the ROIs are contemplated.

In some examples, the perception component 112 may also track an object, such as the traffic lights corresponding to ROIs 124. In some examples, a track may comprise an association between objects detected in two different images. The track may thereby be an indication that the perception component 112 is identifying two object detections as corresponding to a same object. In some examples, the track may additionally or alternatively comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured them image) and/or image-relative characteristics (e.g., a velocity associated with movement of a representation of the object across images in pixels per second, a heading that identifies an angle of movement of the representation of the object in the image). Of course, the track information for an object may comprise any data structure and/or format.

In some instances, the localization component 110 may determine a position of the autonomous vehicle 102 e.g. using any sensor data to localize the autonomous vehicle 102. The perception component 112 may determine data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception component 112 may be collectively referred to as "perception data." In some instances, the map data may be retrieved and provided by the map component 116. More particularly, based on a position of the autonomous vehicle 102, the map component 116 may load or otherwise retrieve from a memory or network local map data and global map data for use by the perception component 112 in detecting and classifying objects from the images. Once the perception component 112 has identified and/or segmented objects from the image and/or determined other perception data, the perception may provide the perception data, including the object detections and/or instance segmentations, to a planning component 114.

In some instances, the planning component 114 may use perception data, including the ROIs, track, and/or segmentations (discussed further below) to generate instructions for controlling operation of the autonomous vehicle 102. For example, the planning component 114 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second, two seconds, eight seconds, etc.) and based at least in part on an ROI, track, and/or segmentation, to control the vehicle to traverse the route; and select one of the potential trajectories as a trajectory of the autonomous vehicle 102 that may be used to generate a drive control signal that may be transmitted to drive components of the autonomous vehicle 102.

The synchronized data component 118 may operate to cause the other components of vehicle 102 to synchronize the vehicle's generation of sensor data, perception data and so on with other vehicle(s) to generate related (or, as may otherwise be described herein, time-related) log data (e.g., another vehicle within given range (e.g., of the perception of the system of one of the vehicle and the other vehicle)). As discussed above, the time-related log data may be utilized to generate environment data based on the time-related observations of two or more autonomous vehicles. In some examples, the generation of such environment data may be based at least in part on synchronized observations (e.g., sensor and/or perception data) by the autonomous vehicles of objects in the environment (e.g., other vehicles, traffic objects, of one another, etc.).

In some examples, the synchronized data component 118 may communicate with the synchronized data component 118 of the other vehicle(s) to synchronize the generation of log data such that subsequent analysis of the time-related log data from the vehicles may determine, for log data of a first vehicle generated at a first time, a timing offset from log data generated by a second vehicle at a second time. Additionally or alternatively, the two or more vehicles may share a time system (e.g., vehicles of a same operator) such that the time-relation of the log data of the two or more vehicles may be determined during a subsequent analysis, potentially without a timing offset being included in the time-related log data generated by the two or more of the vehicles.

In some examples, the generation of log data may be synchronized between the two or more vehicles such that log data of the two or more vehicles is generated at the same timing or within a threshold margin of error. Additionally or alternatively, the log data of the one or more vehicles may be interpolated to align the timings of the log data of the different vehicles during a subsequent analysis (e.g., based on a timing offset determined during the generation of the log data, a timing offset determined based on a shared time system, etc.).

In some examples in which a timing offset is determined based on a shared time system and the log data of the one or more vehicles are interpolated to align the timings of the log data during a subsequent analysis, the synchronized data component 118 may perform no or less coordination with the synchronized data component 118 of other vehicles. In such examples, the log data of the two or more vehicles may be processed (e.g., interpolated) to align the timings of the log data by a remote system.

The synchronized data component 118 may cause the system controller(s) 120 to send the time-related log data to the computing device(s) 126 for use in generating data such as ground truth data, map data for objects in the environment, and so on.

In some examples, the synchronized data component 118 may further operate to receive instructions from the computing device(s) 126 to travel to a location, synchronize with another vehicle specified by the computer device(s) 126, and so on.

In addition, the perception component 112 may determine if (1) an object detected in the image data does not correspond to an object in the map data, (2) an object in the map data is not detected in the image data; or (3) an object in the image data appears to correspond to an object in the map data but has a different position (e.g. a traffic light that has been moved or repositioned on the traffic light assembly). If so, the perception component 112 may flag the detected objects in a plurality of image frames and cause the system controller(s) 120 to send the images of the flagged objects to the map update system 134 over one or more network(s) 122.

As described above and as discussed throughout this disclosure, the vehicle 102 can send image data to one or more computing device(s) 126, via one or more network(s) 122. In some examples, the vehicle 102 can send raw sensor data (e.g. images or other raw sensor data without metadata or identification of detected objects) to the computing device(s) 126. In other examples, the computing device(s) 126 can send processed sensor data and/or representations of sensor data (e.g. processed images or other processed sensor data, for example, with metadata or other additional data identifying of detected object(s) whose presence caused the images to be flagged) to the computing device(s) 126. In some cases, the vehicle 102 can send sensor data (raw or processed) to the computing device(s) 126 as one or more log files. For ease of understanding, the following discussion may refer to sensor data as image data. However, implementations are not so limited and other sensor data such as those described above may be utilized in addition or alternatively to image data.

In at least some examples, the vehicle 102 may detect such traffic objects and/or characteristics to determine discrepancies between such detected information and information included in map data. The detection of such discrepancies may be used as a trigger to send such data to a computing device(s) 126 for updating the map data. In at least some such examples, the vehicle 102 may perform one or more maneuvers based on the discrepancy (such as coming to a safe stop) and/or weighting the contribution of such detections up and/or down in order to continue planning a trajectory through the environment.

The computing device(s) 126 may receive the time-related log data for use in generating data such as ground truth data, map data for objects in the environment, and so on. In at least one example, the computing device(s) 126 can include one or more processors 128 and memory 130 communicatively coupled with the one or more processors 128. In the illustrated example, the memory 130 of the computing device(s) 126 stores a map update system 134 that may include or utilize the functionality of a perception and localization component 136 (hereinafter perception component 136), and a map component 138. In at least one example, the computing device(s) 126 may be or be a portion of an autonomous vehicle control system managing operations of a plurality of autonomous vehicles 102.

The ground truth component 132 may utilize the time-related log data received via the network(s) 122 to generate ground truth data for use in development, training, testing and/or evaluation (e.g., for an autonomous vehicle controller).

In at least some examples, the ground truth data may be utilized with the synchronized log data to generate simulation scenarios. Such simulation scenarios can be used to test a controller of an autonomous vehicle. Simulations scenarios can be used to validate software (e.g., an autonomous controller) executed on autonomous vehicles to ensure that the software is able to safely control such autonomous vehicles. In additional or alternative examples, simulations can be used to learn about the constraints of autonomous vehicles that use the autonomous controller. For instance, simulations can be used to understand the operational space of an autonomous vehicle (e.g., an envelope of parameters in which the autonomous controller effectively controls the autonomous vehicle) in view of surface conditions, ambient noise, faulty components, etc. Simulations can also be useful for generating feedback for improving operations and designs of autonomous vehicles. For instance, simulations can be useful for determining an amount of redundancy that is required in an autonomous controller, or how to modify a behavior of the autonomous controller based on what is learned through simulations.

In an example in which a simulation scenario is to be generated for the operation of the vehicle 102 in an environment including another vehicle, the time-related log data from the vehicle and the other vehicle may be utilized in a variety of ways to provide ground truth data improved over that which may otherwise be generated based on log data of the vehicle 102.

In some systems, the location of a vehicle in an environment, as determined by its own localization component, may be more reliable or likely to be accurate than a location of the vehicle as determined by another vehicle's perception component. In such a system, ground truth generation operations may utilize the location of the other vehicle as determined by the localization component of the other vehicle as the ground truth location of the other vehicle.

In another example, the ground truth component 132 may determine ground truth data for objects in the environment by performing an optimization based on each vehicle's respective position as determined by its own localization component and the perceived relative position of other vehicle(s) and objects in the environment as determined by the vehicles' perception components (e.g., using factor graph optimization). Similar optimizations may be performed for the vehicles' location if the position generated by the localization component is not utilized or may be utilized in combination therewith.

Further, the ground truth component 132 may utilize the time-related log data to fill gaps in object tracking in each vehicle's log data. This may allow the ground truth component 132 to generate longer tracks for objects in the environment than would otherwise be generated based on log data of the first vehicle. For example, an object in the environment may become occluded from view by the perception component of the first vehicle for a period of time before becoming visible again. Ground truth generation operations based on the log data of the first vehicle may determine the sensor data related to the object before and after the object is occluded is related to the same object, but the system may be unable to generate data for the object during the period it was occluded. If the perception component of the second vehicle perceived the object during the period it was occluded from the sensors of the first vehicle, the ground truth generation operations based on the time-related log data may fill the gap in the track of the object by utilizing the sensor and/or perception data of the second vehicle from that time.

In some implementations, a control system, of which the ground truth component 132 may be a part, may instruct two or more autonomous vehicles to collect log data while within perception range of one another. Additionally or alternatively, the ground truth component 132 may passively collect log data from the autonomous vehicles and determine time related log data when performing the ground truth data generation.

As discussed above, the map update system 134 may receive image data via the network(s) 122. The map update system 134 may be configured to update maps based on the received image data.

In some examples, the perception component 136 of the map update system 134 may perform perception processing on the image data to detect an object in the image data. The detected object may be tracked over multiple image frames (e.g. multiple frames of video or multiple still image frames). The information may further include or the map update system 134 may otherwise determine localization information (e.g. the location of the image capture sensor) in the coordinate system of the map data. More particularly, the localization information may localize the vehicle (or image capture sensor) in the environment and may be generated using a variety of techniques (e.g., SLAM) and using potentially many types of sensor data (lidar, GPS, image, IMU). The localization information may also include the pose (position, orientation, etc.) of the camera.

Based on the tracking and the localization information, a proposed location for the object in the coordinate system of the map data may be generated. For example, based on the vehicle position and the camera pose, a UTM (universal transverse Mercator) location (or other location such as latitude and longitude) and a height associated with each pixel in image data may be determined. Over a series of frames, the perception component 136 may triangulate a position of the tracked object in the environment and determine the UTM and/or height information for each frame with adequate certainty. In other words, in some examples, the perception component 136 may project a ray from the camera origin to each pixel in the image and triangulate the position over time. In some examples, this process may be performed without depth data. The UTM and/or height information associated with the center of the tracked object determined over the series of frames may be utilized as the proposed location.

The perception component 136 may also classify the detected object (e.g. as a road sign, a traffic light, etc.). In some examples, the perception component 136 may perform functions similar to and/or in a similar manner to that discussed above with regard to the perception component 112.

The map component 138 of the map update system 134 may retrieve map data provided for the environment, area or geographic location at which the image data was captured. In an example, the environment, area or geographic location at which the image data was captured may be provided as metadata to the received image data or otherwise provided by the system capturing the image data.

Based on the position and/or classification of the object detected by the perception component 136 and the map data provided for the environment, area or geographic location at which the image data was captured, the perception component 136 of the map update system 134 may determine whether or not the map data includes an object of the determined classification at the proposed location.

The map component 138 may add objects to the map data for the proposed locations if the objects are determined not to be present. In a case in which an object is no longer present at the previous location, the map component 138 may be configured to remove the object from the map data.

In some implementations, a control system, of which the map update system 134 may be a part, may instruct one or more autonomous vehicles to travel to the location of the objects of interest to capture the additional image data.

Further, in some examples, the map component 138 may utilize time-related log data to generate and/or update map data related to the environment in which the autonomous vehicles are operating. For example, one or more autonomous vehicles or a remote system may determine an object in the environment does not seem to match or otherwise appear in the map data (e.g., a new object, an object has been moved, etc.). In response, the control system of the map update system may dispatch two or more autonomous vehicles to obtain time-related log data including the object that does not seem to match or otherwise appear in the map data.

The map update system 134 may then generate map data, for example, in a similar manner as discussed above for the ground truth generation operations for simultaneously viewed objects (e.g., by joint optimization based on each autonomous vehicles' respective position as determined by its own localization component and the perceived relative position of the object and the other vehicles(s) in the environment as determined by the vehicles' perception components). As discussed previously, the generated map data for the object may be compared to existing map data to determine if the object is a new map object, a moved map object, or already present in the map data. The map data may then be updated accordingly. In any such example, offsets and/or synchronization need not necessarily be performed. As a non-limiting example of which, detections of a vehicle in a fleet of vehicles by another vehicle in the fleet of vehicles may be used as another factor (or constraint) in a factor graph. Such constraint may be relied upon, at least in part, when performing an optimization such that the co-visibility (regardless of synchronization of data) may be utilized to improve optimizations. In various such examples, a detection of the perception component of a first vehicle may indicate the presence of a second vehicle in the fleet of vehicles in the sensor data (e.g., there may be a particular detection to recognize that the vehicle is a member of the fleet, whether by type and/or by identifying indicia). In the event that no identifying indicia is present (either by design or by occlusion), log data of the fleet may be queried to determine the most likely vehicle or vehicles in the fleet of vehicles at the position indicated by the detection of the first vehicle.

Figure 2:
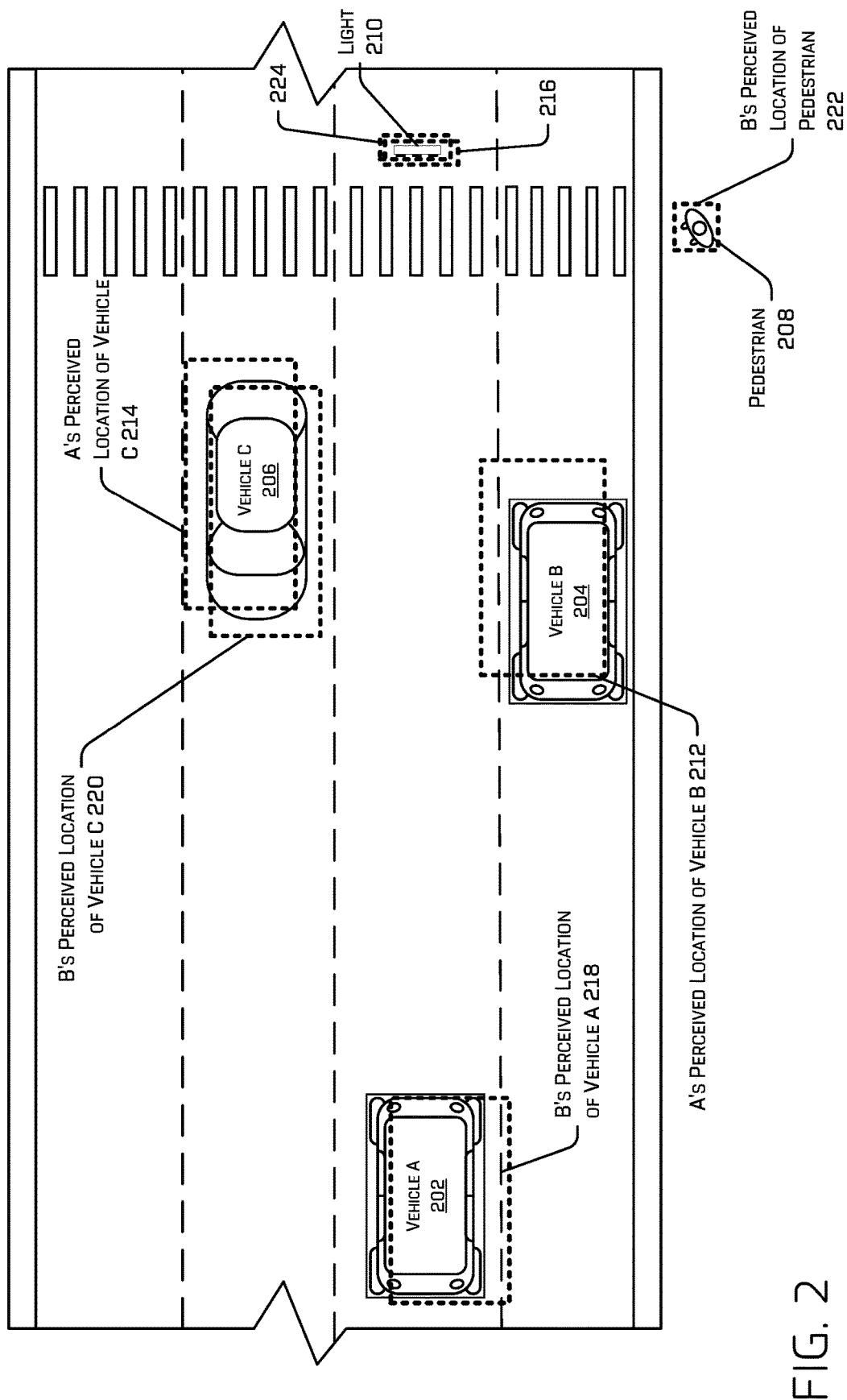
FIG. 2 illustrates an example environment for discussion of scenarios in which autonomous vehicles may generate time-related log data.

FIG. 2 illustrates an example environment 200 for discussion of scenarios in which autonomous vehicles may generate time-related log data. As discussed above, the time-related log data may be utilized to generate environment data based on the time-related observations of two or more autonomous vehicles. In some examples, the generation of such environment data may be based at least in part on time-related observations (e.g., sensor and/or perception data) by the autonomous vehicles of objects in the environment (e.g., other vehicles, traffic objects, of one another, etc.).

As illustrated, environment 200 includes an autonomous vehicle A 202, an autonomous vehicle B 204, a vehicle C 206, and a pedestrian 208 traveling on a road segment including a traffic light 210.

Prior to the time shown in FIG. 2, vehicle A 202 and vehicle B 204 may have communicated to establish the identity of the other vehicle and/or to establish a synchronization of their log data generation. As an example, vehicle A 202 may establish the identity of vehicle B 204 by determining a vehicle in the output of vehicle A's perception component at a location that overlaps with a localization location determined by the localization component of vehicle B (e.g., provided by vehicle B). As discussed above, the synchronization of the generation of log data may be established by synchronizing the timing of data generation by vehicle A 202 and vehicle B 204 (e.g., to within a threshold timing error) or by storing a timing relationship between the log data of vehicle A 202 and vehicle B 204. Additionally or alternatively, vehicles A 202 and B 204 may not need to establish a synchronization or a timing relationship between the log data of the vehicles. For example, vehicles A 202 and B 204 share a time system such that the time-relation of the log data of vehicles A 202 and B 204 may be determined during a subsequent analysis. As discussed above, time related log data may allow subsequent analysis of the time-related log data from vehicle A 202 and vehicle B 204 may determine, for log data of vehicle A 202 generated at a first time, a timing offset from log data generated by vehicle B 204 at a second time. Depending on the example, vehicle A 202 and vehicle B 204 may have initiated time-related operations in response to instructions from a remote-control system (e.g., a dispatch system or computing device(s) 126), may have initiated time-related operations upon entering perception range of one another, or based on another trigger.

In a first example scenario, vehicle A 202 and vehicle B 204 may be operating to capture time-related log data for use in generating ground truth data for development, training, testing and/or evaluation of autonomous vehicle controllers.

In a second example scenario, vehicle A 202 and vehicle B 204 may be operating to capture time-related log data for use in updating map data used by autonomous vehicles to traverse the environment.

In operation, vehicle A 202 may capture log data including the location of vehicle A 202 as determined by the localization component of vehicle A 202 as well as the locations of other objects in the environment as determined by the perception component of vehicle A 202. In particular, the perception component of vehicle A 202 may determine a perceived location 212 of vehicle B, a perceived location 214 of the vehicle C, and a perceived location 216 of the light. As illustrated, pedestrian 208 is occluded from the sensors of vehicle A 202 by vehicle B 204.

Similarly, vehicle B 204 may capture log data including the location of vehicle B 204 as determined by the localization component of vehicle B 204 as well as the locations of other objects in the environment as determined by the perception component of vehicle B 204. In particular, the perception component of vehicle B 204 may determine a perceived location 218 of vehicle A, a perceived location 220 of the vehicle C, a perceived location 222 of the pedestrian and a perceived location 224 of the light.

As discussed above, the log data captured by vehicle A 202 and vehicle B 204 may include sensor data, perception data and synchronization data to allow a computing device performing a subsequent analysis to find log data captured for both vehicles at a given time.

In the first example scenario given above, a computing device (e.g. computing device(s) 126) may utilize the time-related log data captured by vehicle A 202 and vehicle B 204 in a variety of ways to generate ground truth data for vehicle A 202.

First, where the location of a vehicle in an environment, as determined by its own localization component, is more reliable or likely to be accurate than a location of the vehicle as determined by another vehicle's perception component, the ground truth component 132 of the computing device(s) 126 may utilize the location of the other vehicle as determined by the localization component of the other vehicle as the ground truth location of the other vehicle. In the illustrated example, the ground truth component 132 of the computing device(s) 126 may ignore or reduce any weight given to A's perceived location 212 of vehicle B in favor of the location of vehicle B as determined by the localization component of vehicle B. Similarly, the ground truth component 132 may utilize the location of the light 210 determined from map data instead of the perceived locations determined by the perception components of the vehicles A and B.

Second, the ground truth component 132 may determine ground truth data for objects in the environment by performing an optimization based on each vehicle's respective position as determined by its own localization component and the perceived relative position of other vehicle(s) and objects in the environment as determined by the vehicles' perception components (e.g., using factor graph optimization). In the illustrated example, to determine the ground truth positions of vehicle C 206, the ground truth component 132 of the computing device(s) 126 may perform an optimization based on the location of vehicle A as determined by the localization component of vehicle A, the location of vehicle B as determined by the localization component of vehicle B, A's perceived location 212 of vehicle B, A's perceived location 214 of the vehicle C, B's perceived location 218 of vehicle A, and B's perceived location 220 of the vehicle C. Further, the optimization to determine the ground truth location of vehicle C may be performed over the entire track of time-related observations of vehicle C (e.g., by using the available log data across vehicle C's track in the time-related log data). Similar optimizations may be performed for the locations of vehicles A and B if the location generated by the localization components thereof are not considered significantly more reliable than the perceived location measured by another vehicle (e.g., if a certainty metric of the localization component has degraded).

Figure 3:
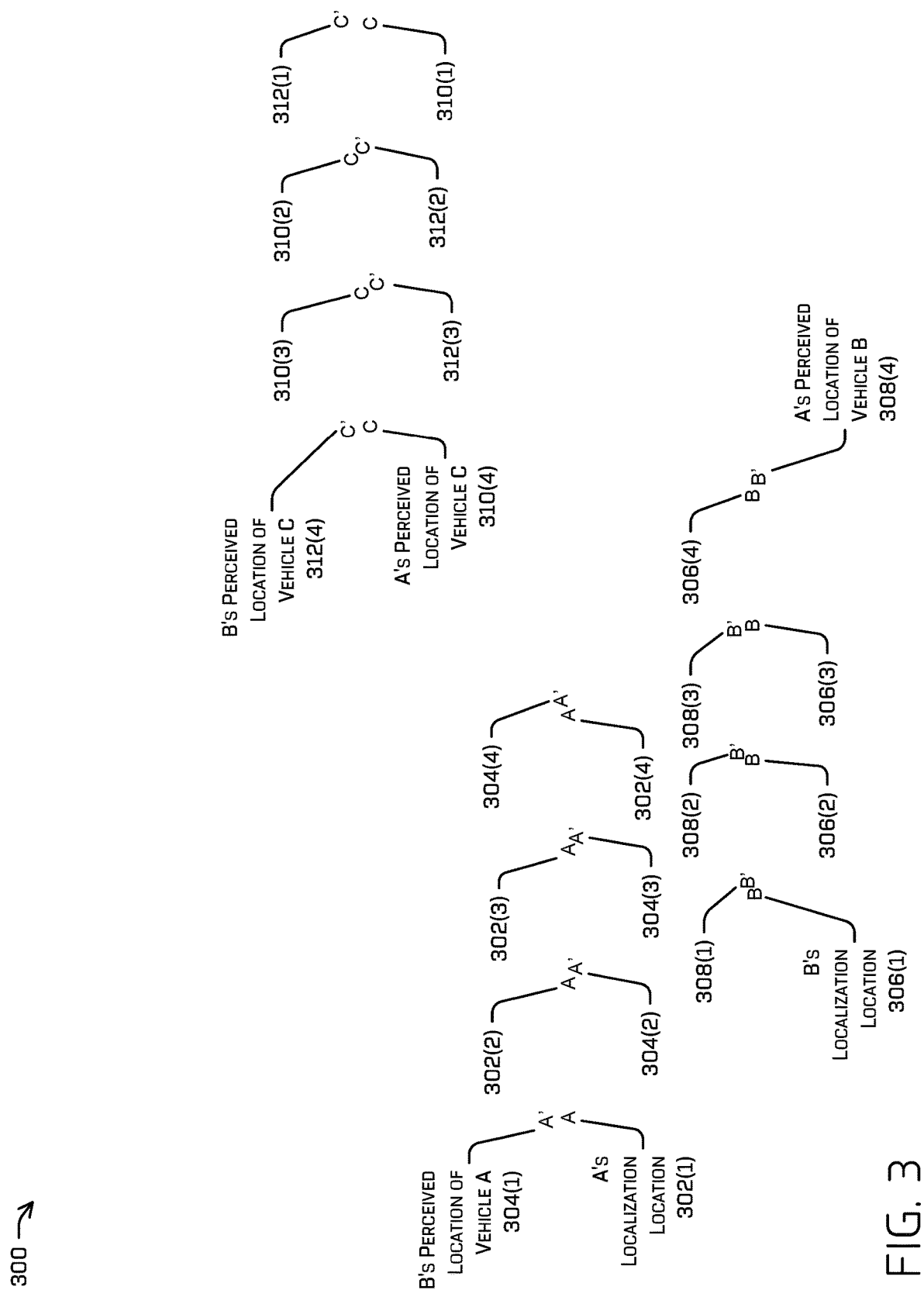
FIG. 3 illustrates an example diagram of time-related log data for use in performing a factor graph joint optimization of time related log data of two autonomous vehicles to determine the location of another vehicle.

FIG. 3 illustrates a diagram of example time related log data 300 of two autonomous vehicles that may be used in performing a factor graph joint optimization to determine various poses of the vehicle(s) while traversing an area. In the illustrated example, the time related log data 300 includes observations for four times (e.g., indicated by (1), (2), (3), and (4)). Observations for a point in time may be one or more of interpolated from unaligned observations to be time aligned observations, observations taken at the same time or within a threshold amount of time, the closest-in-time observations of the time related sources for a point in time or the like. As illustrated, the time related log data 300 includes vehicle A's localization location 302(1)-302(4) as determined by the localization component of vehicle A, vehicle B's perceived location of vehicle A 304(1)-304(4), vehicle B's localization location 306(1)-306(4) as determined by the localization component of vehicle B, vehicle A's perceived location 308(1)-308(4) of vehicle B, vehicle A's perceived location 310(1)-310(4) of the vehicle C, and vehicle B's perceived location 312(1)-312(4) of the vehicle C.

A factor graph joint optimization may be performed using the time related log data 302-312 to provide ground truth data for the location of vehicle C across times (1) to (4). More particularly, a factor graph may be generated for the time related log data 302-312 across times (1) to (4). The factor graph may then be optimized to determine the location of vehicle C across times (1) to (4). One of ordinary skill in the art would understand how to perform factor graph joint optimization for time related log data as discussed above in view of this disclosure.

In some examples, an offset between vehicle A's localization location 302(1)-302(4) and vehicle B's perceived location of vehicle A 304(1)-304(4) may be indicative of an error that may be present in vehicle B's perceived location 312(1)-312(4) of the vehicle C. Similarly, an offset between vehicle B's localization location 306(1)-306(4) and vehicle A's perceived location 308(1)-308(4) of vehicle B may be indicative of an error that may be present in vehicle A's perceived location 310(1)-310(4) of the vehicle C. Of course, such localization may also be used for determining whether one or more other systems are functioning properly as well. As a non-limiting example of which, errors or differences between a detected location of a second vehicle from the perspective of a first vehicle compared with where the second vehicle believes to be localized may be indicative of an error of the perception system of the first vehicle and used to refine such systems. In aggregate (e.g., using a set of data that is within a temporal threshold of a geographic overlap), errors may be used to improve a perception system (e.g., by using the values of positions of objects (including other vehicles in the fleet) as ground truth for additional training of machine learned models). In some examples, the addition of the indications of the error that may be present in vehicle B's perceived location 312(1)-312(4) of the vehicle C and the error that may be present in vehicle A's perceived location 310(1)-310(4) of the vehicle C may provide improved ground truth data for the location of vehicle C across times (1) to (4) a factor graph joint optimization performed using of log data of the vehicles A and B without time relation.

Third, the ground truth component 132 may utilize the time-related log data to fill gaps in object tracking in each vehicle's log data. This may allow the ground truth component 132 to generate longer tracks for objects in the environment than would otherwise be generated based on log data of vehicle A 202 (e.g., for which a testing scenario is being generated). For example, at the illustrated time in FIG. 2, the pedestrian 208 is occluded from the sensors of vehicle A 202 by vehicle B 204. Ground truth generation operations based on the log data of the vehicle A 202 may determine the sensor data related to the pedestrian 208 before and after the gap and may determine the data on each side of the gap is related to the same pedestrian. However, the ground truth component 132 may be unable to generate data for the pedestrian 208 during the period the pedestrian 208 was occluded based only on the log data of vehicle A 202. Because the perception component of the vehicle B 204 perceived the location 222 of the pedestrian 208 during the period the pedestrian 208 was occluded from the sensors of the vehicle A 202, the ground truth component 132 may fill the gap in the track for the pedestrian 208 by utilizing the sensor and/or perception data of the vehicle B 204 from that time. In some examples, ground truth data including longer tracks as discussed above may allow for improved training of a tracking system of an autonomous vehicle controller.

Additionally or alternatively, the ground truth component 132 of the computing device(s) 126 may perform an optimization based on the location data available for pedestrian 208 along the track of the pedestrian 208. The ground truth component 132 of the computing device(s) 126 may perform the optimization using available sources of time-related log data when available. For example, when another autonomous vehicle moves into perception range of objects in the scenario, vehicle A 202 or the computing device(s) 126 may request or cause the other autonomous vehicle to become an additional source of time-related log data. Further, sources of time-related log data may also stop providing data for a given object or discontinue time related log data generation. For example, during the scenario, after vehicle B 204 has passed the light 210, the light 210 may turn red and vehicle A 202 may be stopped. Sometime before vehicle B 204 leaves perception range, another autonomous vehicle D may come into perception range. As vehicle B 204 leaves perception range, vehicles A 202 and B 204 may discontinue time related log data generation. As autonomous vehicle D comes into perception range, vehicle A or the computing device(s) 126 may request or cause vehicle D to become an additional source of time-related log data (e.g., for the pedestrian 208). As such, during a period after vehicle D enters perception range and becomes a time-related log data source and before vehicle B 204 leaves perception range, the time-related log data generation may include time-related log data for three sources of time-related log data. When vehicle B 204 subsequently leaves perception range, the number of sources may be reduced back to two.

In the second example scenario given above (e.g., relating to the updating of map data), a computing device (e.g. computing device(s) 126) may utilize the time-related log data captured by vehicle A 202 and vehicle B 204 in a variety of ways to determine if the time-related log data includes changes in traffic objects for which the map data should be updated. The operations of the map component 138 to determine the location of objects in the time-related log data may be the similar to those discussed above for the ground truth component 132 though the map component 138 may differ in the treatment of traffic objects.

For example, while the ground truth component 132 may ignore or give reduced weight to the perceived positions of the traffic objects present in map data and treat the locations in map data as ground truth, the map component 138 may perform optimizations similar to those discussed above for vehicle C 206 and pedestrian 208 to determine a location of the light 210. For example, the map component 138 may perform an optimization based on the location of vehicle A as determined by the localization component of vehicle A, the location of vehicle B as determined by the localization component of vehicle B, A's perceived location 212 of vehicle B, A's perceived location 216 of the light, B's perceived location 218 of vehicle A, and B's perceived location 224 of the light. The map component 138 may then determine if the determined location matches that of a matching light in map data. If the light 210 is not present in map data or has moved from the location included in map data, the map component 138 may cause map data to be updated. A similar operation may be performed for traffic objects that have been removed from the environment (e.g., are present in map data but have been removed in the physical world).

Figure 4:
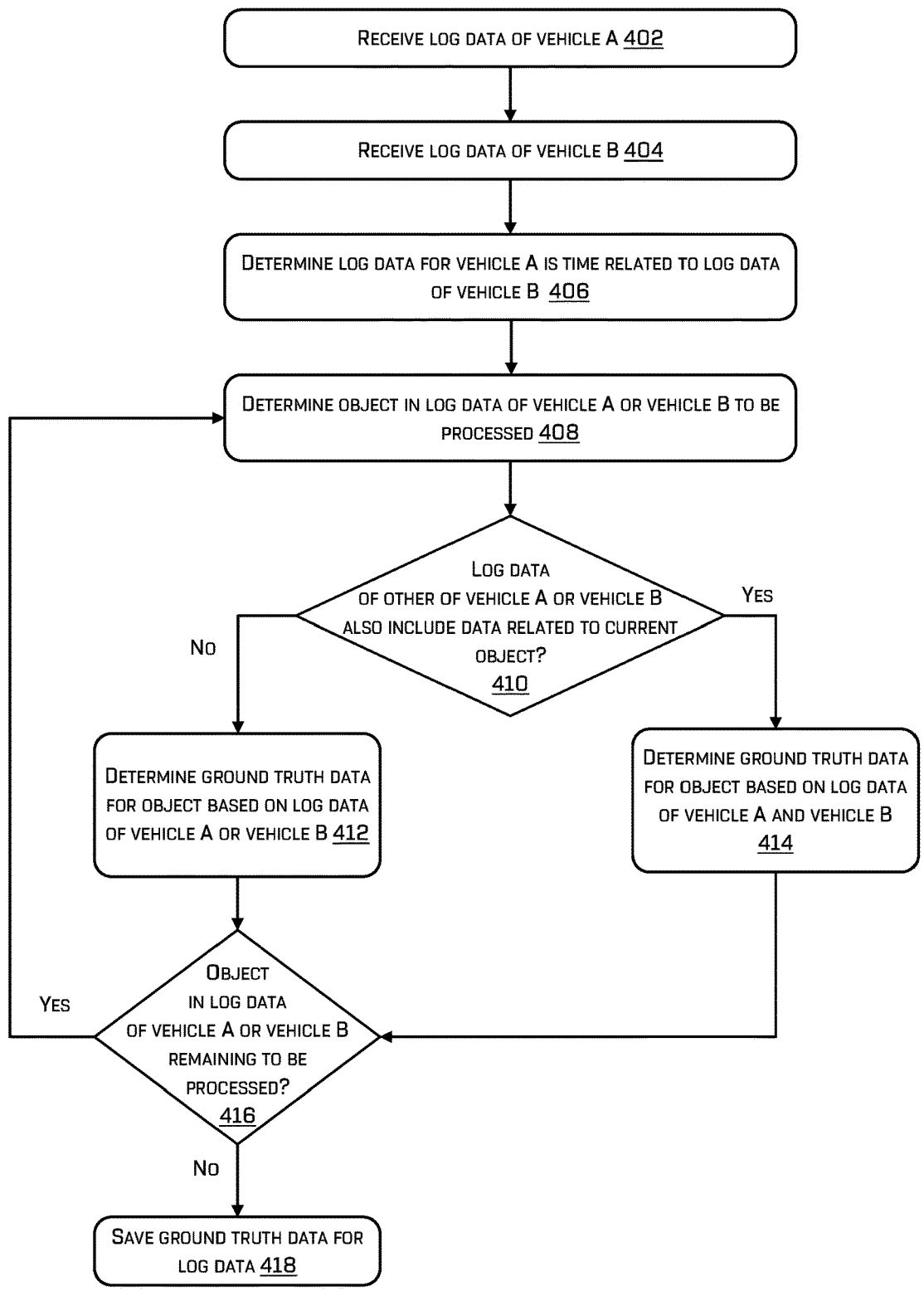
FIG. 4 illustrates a flow diagram of an example process for utilizing time-related log data captured by a plurality of sources to generate ground truth data.

FIG. 4 illustrates a flow diagram of an example process 400 for utilizing time-related log data captured by a plurality of sources to generate ground truth data. In some examples, process 400 may be accomplished by component(s) of system 100 or environment 200. In some examples, the example process 400 may be performed by an onboard computer system of an autonomous vehicle 102 or 202-204, may be performed in whole or in part by aspects of the computing device(s) 108 or 126 or by a combination thereof. While FIG. 4 is discussed in the specific context of generating ground truth data among two vehicles, specifically a vehicle A and a vehicle B, some implementations may perform similar operations with more than two sources of time-related log data, in an online context or with regard to determining any other data from time-related sources of data.

At operation 402, a system performing process 400 may receive log data of vehicle A. At operation 404, the system may receive log data of vehicle B.

The system may then begin generating ground truth data from the sensor and perception data included in the log data of vehicle A. At operation 406, the system may determine that at least a portion of the log data of vehicle B is time related log data to least a portion of the log data of vehicle A. As discussed above, log data of a first vehicle may be time related to log data of a second vehicle if the log data include observations while the vehicles were within perception range of one another and a time relationship between the logs is included in the log data or can be determined for the log data.

At operation 408, the system may then determine an object in the log data of vehicle A or vehicle B that is to be processed (e.g., for which ground truth data has yet to be generated).

At operation 410, the system may determine if the log data of the other of vehicle A or vehicle B also includes data related to current object to be processed. In examples including more than two sources of time-related log data, the system may determine if any other source includes time-related log data for the current object. If not, the process may continue to 412. Otherwise, the process may continue to 414.

At operation 412, the system may determine ground truth data for the current object based on the log data of the vehicle whose log data included the object. Additionally or alternatively, the system may determine ground truth data for the current object based on one vehicle's log data if the other vehicle's log data has a low confidence level.

At operation 414, the system may determine ground truth data for the current object based on the time-related log data of both vehicle A and vehicle B (e.g., as discussed above with respect to FIGS. 1 and 2).

Following operation 412 or 414, the system may determine whether an object in the log data of vehicle A or vehicle B remains to be processed. If so, the process may return to 408 for processing of the next object. Otherwise, the process may continue to 418.

At operation 418, the system may save the ground truth data for use in development, training, testing and/or evaluation of autonomous vehicle controllers.

Figure 5:
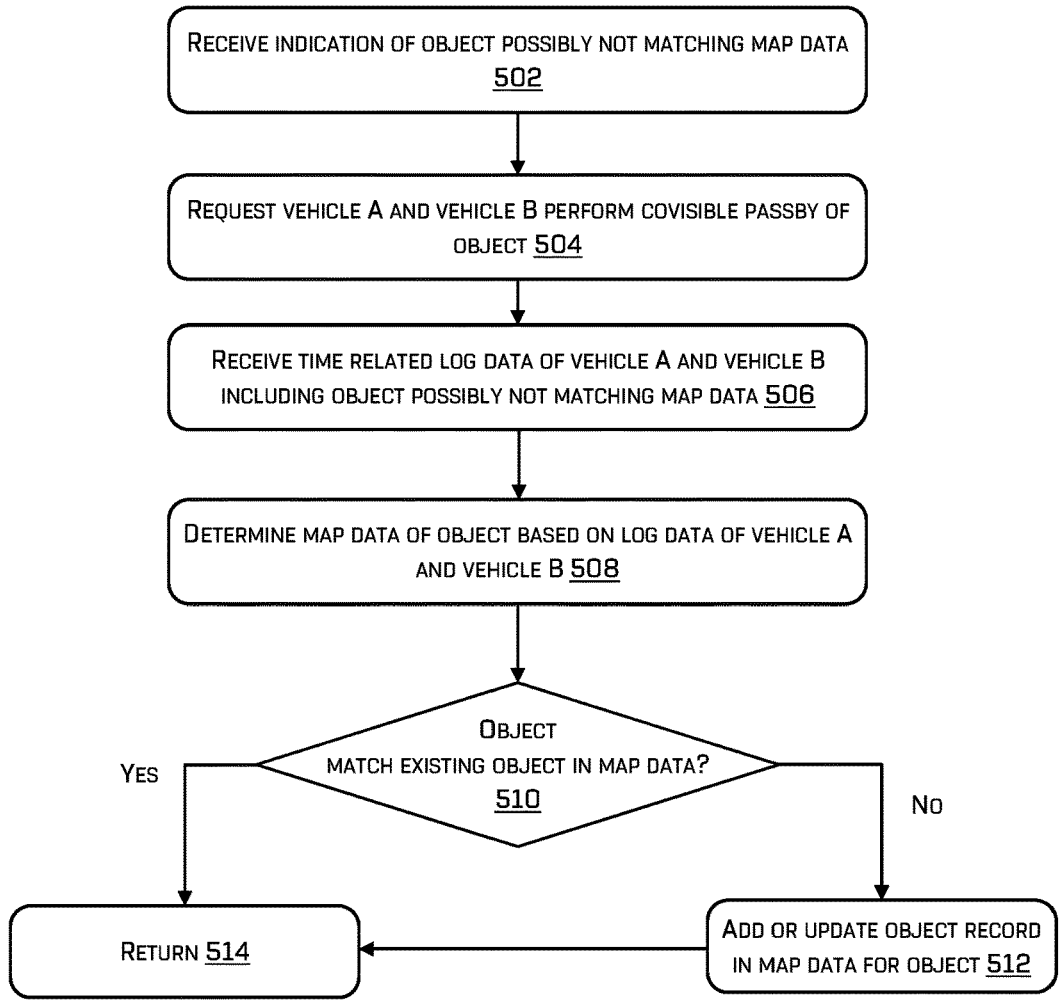
FIG. 5 illustrates a flow diagram of an example process for utilizing time-related log data captured by a plurality of sources to create, or perform updates to, map data.

FIG. 5 illustrates a flow diagram of an example process 500 for utilizing time-related log data captured by a plurality of sources to perform updates to map data. More particularly, the process 500 may utilize time-related log data captured by the plurality of sources to determine if changes in traffic objects have occurred for which the map data should be updated. If so, the process 500 includes making such updates to the map data. In some examples, process 500 may be accomplished by component(s) of system 100 or environment 200. In some examples, the example process 500 may be performed by an onboard computer system of an autonomous vehicle 102 or 202-204, may be performed in whole or in part by aspects of the computing device(s) 108 or 126 or by a combination thereof. While FIG. 5 is discussed in the specific context of generating map updates based on time-related log data of two vehicles, specifically a vehicle A and a vehicle B, some implementations may perform similar operations with more than two sources of time-related log data, in an online context or with regard to determining any other data from time-related sources of data.

At operation 502, the system may receive an indication of a traffic object possibly not matching map data. For example, a lone autonomous vehicle may determine a traffic light is present which does not appear to match a traffic light in the map data or that a traffic light in map data appears to be missing or to have moved. However, implementations are not limited to the system receiving such notifications. Instead, the system may monitor log data regarding traffic object detections to detect such changes. Other variations would be apparent to one of ordinary skill in the art in view of this disclosure.

At operation 504, the system may request vehicle A and vehicle B perform a co-visible pass by of the traffic object. For example, the system may be part of or associated with a dispatch system for autonomous vehicles. For example, the system may determine that vehicles A and B are currently idle and request the vehicles perform a co-visible pass by. The system may then receive time-related log data of vehicle A and vehicle B including the object that is possibly not matching an object in map data at operation 506.

At operation 508, the system may determine map data for the object based on the time-related log data of vehicle A and vehicle B. For example, the system may determine map data for the object in a similar manner to that discussed above with regard to FIGS. 1-4.

At operation 510, the system may compare the data generated for the object to objects in the map data to determine if the object matches an existing object in map data. If so, the process may continue to 514, where process 500 returns or otherwise stops. If not, the process may continue to operation 512, where the system may add or update an object record in map data for the object.

Implementations are not limited to updating existing map data and/or based on actively collected time related log data. In such an example, the flow of FIG. 5 may begin with block 508 and be performed based on existing log data of two or more vehicles and/or may include an operation to determine time related portions of the log data of different vehicles (e.g., similar to block 410 above).

Note that, although the example processes 400 and 500 are depicted as sequential operations, it is understood that the operations discussed herein may be performed in a different order (or omitted), simultaneously, and/or by one or more devices.

EXAMPLE CLAUSES

A. A system comprising: one or more processors; and one or more non-transitory computer-readable media storing processor-executable instructions that, when executed by the one or more processors, cause the system to perform operations comprising: receiving first log data associated with a first autonomous vehicle, the first log data comprising one or more of first sensor data associated with first sensors of the first autonomous vehicle or first perception data associated with a first perception component of the first autonomous vehicle; receiving second log data associated with a second autonomous vehicle, the second log data comprising one or more of second sensor data associated with second sensors of the second autonomous vehicle or second perception data associated with a second perception component of the second autonomous vehicle; determining that at least a first portion of the first log data is time related to at least a second portion of the second log data; and generating object data for an object based at least in part the first portion of the first log data and the second portion of the second log data.

B. The system of clause A, wherein the object data for the object is ground truth data, the operations further comprising: generating additional ground truth data for the second autonomous vehicle based on location data of the second autonomous vehicle generated by a localization component of the second autonomous vehicle.

C. The system of clause A, wherein the generating the object data for the object based at least in part the first portion of the first log data and the second portion of the second log data comprises: performing an optimization based at least on a first location data of the object generated by the first perception component of the first autonomous vehicle and a second location data of the object generated by the second perception component of the second autonomous vehicle, the second location data being associated with the first location data in the time relation of the second log data and the first log data.

D. The system of clause C, wherein performing the optimization is further based at least on a third location data of the first autonomous vehicle generated by a first localization component of the first autonomous vehicle and a fourth location data of the second autonomous vehicle generated by a localization component of the second autonomous vehicle.

E. The system of clause D, wherein performing the optimization is further based at least in part on a fifth location data of the first autonomous vehicle generated by the second perception component of the second autonomous vehicle and a sixth location data of the second autonomous vehicle generated by the first perception component of the first autonomous vehicle.

F. The system of clause E, wherein performing the optimization is further based at least in part on an offset between the third location data and the fifth location data.

G. A method comprising: receiving first log data associated with a first autonomous vehicle; receiving second log data associated with a second autonomous vehicle; determining at least a first portion of the first log data and a second portion of the second log data that are associated with one another; determining, based at least in part on the first log data, a first location of an object; determining, based at least in part on the second log data, a second location of the object; and determining a resultant location of the object based at least in part on the first location and the second location.

H. The method of clause G, wherein determining the first portion of the first log data and the second portion of the second log data are associated with one another determines the first portion and the second portion include timed related log data of the object.

I. The method of clause H, wherein determining the resultant location comprises: generating, based at least in part on the first location and the second location, a factor graph; and optimizing the factor graph.

J. The method of clause I, further comprising: determining, based at least in part on the second log data, a third location of the second autonomous vehicle generated by a localization component of the second autonomous vehicle; determining, based at least in part on the first log data, a fourth location of the first autonomous vehicle and wherein the third location is time related to the fourth location and the generating the factor graph is further based at least in part on the third location and the fourth location.

K. The method of clause J, wherein optimizing the factor graph is further based at least in part on an offset between the third location and the fourth location. <

L. The method of clause H, further comprising: determining, based at least in part on the second log data, a third location of the object wherein the third location of the object is associated with a time at which the object was occluded from sensors of the first autonomous vehicle;

and determining a second resultant location based at least in part on the third location of the object.

M. The method of clause G, wherein the resultant location of the object is ground truth data, the method further comprising: generating additional ground truth data for the second autonomous vehicle based on location data of the second autonomous vehicle generated by a localization component of the second autonomous vehicle.

N. The method of clause G wherein further comprising: generating, based at least in part on the resultant location, a map; and transmitting the map to the first autonomous vehicle, the first autonomous vehicle being configured to be controlled based at least in part on the map O. One or more non-transitory computer-readable media storing processor-executable instructions that, when executed by one or more processors, cause the one or more processors to perform operations comprising: receiving first log data associated with a first autonomous vehicle; receiving second log data associated with a second autonomous vehicle; determining at least a first portion of the first log data and a second portion of the second log data that are associated with one another; determining, based at least in part on the first log data, a first location of an object; determining, based at least in part on the second log data, a second location of the object; and determining a resultant location of the object based at least in part on the first location and the second location.

P. The one or more non-transitory computer-readable media of clause O, wherein determining the first portion of the first log data and the second portion of the second log data are associated with one another determines the first portion and the second portion include timed related log data of the object.

Q. The one or more non-transitory computer-readable media of clause P, wherein determining the resultant location comprises: generating, based at least in part on the first location and the second location, a factor graph; and optimizing the factor graph.

R. The one or more non-transitory computer-readable media of clause Q, further comprising: determining, based at least in part on the second log data, a third location of the second autonomous vehicle generated by a localization component of the second autonomous vehicle; determining, based at least in part on the first log data, a fourth location of the first autonomous vehicle; and wherein: the third location is time related to the fourth location; the generating the factor graph is further based at least in part on the third location and the fourth location; and optimizing the factor graph is further based at least in part on an offset between the third location and the fourth location.

S. The one or more non-transitory computer-readable media of clause O, the operations further comprising: determining, based at least in part on the second log data, a third location of the object wherein the third location of the object is associated with a time at which the object was occluded from sensors of the first autonomous vehicle; and determining a second resultant location based at least in part on the third location of the object.

T. The one or more non-transitory computer-readable media of clause O, the operations further comprising: generating, based at least in part on the resultant location, a map; and transmitting the map to the first autonomous vehicle, the first autonomous vehicle being configured to be controlled based at least in part on the map.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing processor-executable instructions that, when executed by the one or more processors, cause the system to perform operations comprising:
receiving first log data associated with a first autonomous vehicle, the first log data comprising one or more of first sensor data associated with first sensors of the first autonomous vehicle or first perception data associated with a first perception component of the first autonomous vehicle;
receiving second log data associated with a second autonomous vehicle, the second log data comprising one or more of second sensor data associated with second sensors of the second autonomous vehicle or second perception data associated with a second perception component of the second autonomous vehicle;
determining that at least a first portion of the first log data is time related to at least a second portion of the second log data, based at least in part on:
an object being detected in the first portion of the first log data and being detected in the second portion of the second log data, or
the first autonomous vehicle being detected in the second log data of the second autonomous vehicle; and
generating object data for the object based at least in part on the first portion of the first log data and the second portion of the second log data.

2. The system of claim 1, wherein the object data for the object is ground truth data, the operations further comprising:
generating additional ground truth data for the second autonomous vehicle based on location data of the second autonomous vehicle generated by a localization component of the second autonomous vehicle.

3. The system of claim 1, wherein the generating the object data for the object based at least in part the first portion of the first log data and the second portion of the second log data comprises:
performing an optimization based at least on a first location data of the object generated by the first perception component of the first autonomous vehicle and a second location data of the object generated by the second perception component of the second autonomous vehicle, the second location data being associated with the first location data in the time relation of the second log data and the first log data.

4. The system of claim 3, wherein performing the optimization is further based at least on a third location data of the first autonomous vehicle generated by a first localization component of the first autonomous vehicle and a fourth location data of the second autonomous vehicle generated by a localization component of the second autonomous vehicle.

5. The system of claim 4, wherein performing the optimization is further based at least in part on a fifth location data of the first autonomous vehicle generated by the second perception component of the second autonomous vehicle and a sixth location data of the second autonomous vehicle generated by the first perception component of the first autonomous vehicle.

6. The system of claim 5, wherein performing the optimization is further based at least in part on an offset between the third location data and the fifth location data.

7. A method comprising:
receiving first log data associated with a first autonomous vehicle;
receiving second log data associated with a second autonomous vehicle;
determining at least a first portion of the first log data and a second portion of the second log data that are time related, based at least in part on:
an object being detected at a first location in the first portion of the first log data and being detected at a second location in the second portion of the second log data; and
determining a resultant location of the object based at least in part on the first location and the second location.

8. The method of claim 7, wherein determining the first portion of the first log data and the second portion of the second log data are associated with one another determines the first portion and the second portion include timed related log data of the object.

9. The method of claim 8, wherein determining the resultant location comprises:
generating, based at least in part on the first location and the second location, a factor graph; and
optimizing the factor graph.

10. The method of claim 9, further comprising:
determining, based at least in part on the second log data, a third location of the second autonomous vehicle generated by a localization component of the second autonomous vehicle; and
determining, based at least in part on the first log data, a fourth location of the first autonomous vehicle and wherein the third location is time related to the fourth location and the generating the factor graph is further based at least in part on the third location and the fourth location.

11. The method of claim 10, wherein optimizing the factor graph is further based at least in part on an offset between the third location and the fourth location.

12. The method of claim 8, further comprising:
determining, based at least in part on the second log data, a third location of the object wherein the third location of the object is associated with a time at which the object was occluded from sensors of the first autonomous vehicle; and
determining a second resultant location based at least in part on the third location of the object.

13. The method of claim 7, wherein the resultant location of the object is ground truth data, the method further comprising:
generating additional ground truth data for the second autonomous vehicle based on location data of the second autonomous vehicle generated by a localization component of the second autonomous vehicle.

14. The method of claim 7, further comprising:
generating, based at least in part on the resultant location, a map; and
transmitting the map to the first autonomous vehicle, the first autonomous vehicle being configured to be controlled based at least in part on the map.

15. One or more non-transitory computer-readable media storing processor-executable instructions that, when executed by one or more processors, cause the one or more processors to perform operations comprising:
receiving first log data associated with a first autonomous vehicle;
receiving second log data associated with a second autonomous vehicle;

determining at least a first portion of the first log data and a second portion of the second log data that are time related, based at least in part on:
- an object being detected at a first location in the first portion of the first log data and being detected at a second location in the second portion of the second log data; and
- determining a resultant location of the object based at least in part on the first location and the second location.

16. The one or more non-transitory computer-readable media of claim 15, wherein determining the first portion of the first log data and the second portion of the second log data are associated with one another determines the first portion and the second portion include timed related log data of the object.

17. The one or more non-transitory computer-readable media of claim 16, wherein determining the resultant location comprises:
- generating, based at least in part on the first location and the second location, a factor graph; and
- optimizing the factor graph.

18. The one or more non-transitory computer-readable media of claim 17, the operations further comprising:
- determining, based at least in part on the second log data, a third location of the second autonomous vehicle generated by a localization component of the second autonomous vehicle; and
- determining, based at least in part on the first log data, a fourth location of the first autonomous vehicle; and wherein:
- the third location is time related to the fourth location;
- the generating the factor graph is further based at least in part on the third location and the fourth location; and
- optimizing the factor graph is further based at least in part on an offset between the third location and the fourth location.

19. The one or more non-transitory computer-readable media of claim 15, the operations further comprising:
- determining, based at least in part on the second log data, a third location of the object wherein the third location of the object is associated with a time at which the object was occluded from sensors of the first autonomous vehicle; and
- determining a second resultant location based at least in part on the third location of the object.

20. The one or more non-transitory computer-readable media of claim 15, the operations further comprising:
- generating, based at least in part on the resultant location, a map; and
- transmitting the map to the first autonomous vehicle, the first autonomous vehicle being configured to be controlled based at least in part on the map.

* * * * *